United States Patent
Keren

(10) Patent No.: US 9,772,057 B2
(45) Date of Patent: Sep. 26, 2017

(54) IRRIGATION PIPE COUPLER

(75) Inventor: Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 924 days.

(21) Appl. No.: 14/004,707

(22) PCT Filed: Feb. 4, 2012

(86) PCT No.: PCT/IB2012/050520
§ 371 (c)(1),
(2), (4) Date: Sep. 12, 2013

(87) PCT Pub. No.: WO2012/123827
PCT Pub. Date: Sep. 20, 2012

(65) Prior Publication Data
US 2014/0001743 A1    Jan. 2, 2014

Related U.S. Application Data

(60) Provisional application No. 61/452,118, filed on Mar. 13, 2011.

(51) Int. Cl.
*F16L 37/04* (2006.01)
*F16L 33/22* (2006.01)

(52) U.S. Cl.
CPC ............. *F16L 37/04* (2013.01); *F16L 33/225* (2013.01); *F16L 2201/10* (2013.01)

(58) Field of Classification Search
CPC ........ F16L 37/04; F16L 33/225; F16L 33/227
See application file for complete search history.

(56) References Cited

U.S. PATENT DOCUMENTS

| 4,278,279 A | 7/1981 | Zimmerman |
| 4,903,995 A | 2/1990 | Blenkush et al. |

(Continued)

FOREIGN PATENT DOCUMENTS

| EP | 1215433 | 6/2002 |
| EP | 2025988 | 2/2009 |

(Continued)

OTHER PUBLICATIONS

International Search Report dated Oct. 2, 2012 issued in PCT counterpart application (No. PCT/162012/050520).

(Continued)

*Primary Examiner* — James M Hewitt
(74) *Attorney, Agent, or Firm* — Womble Carlyle

(57) ABSTRACT

An irrigation pipe coupler can engage an open end of an irrigation pipe with its forward end. The coupler has a nipple and an outer collar. The nipple has an outwardly projecting barb and the collar surrounds the nipple and has an inwardly projecting bulge. The collar is slidably moved along the nipple between forward and rear terminal positions while being kept spaced radially outwardly from the nipple via a peripheral gap that is re-defined for each new position of the collar along the nipple. At each such new position, the gap has a narrow region measured in the radial direction where the collar is closest to the nipple and the narrow region gets smaller at least during at least part of the forward movement of the collar along the nipple. A window formed in the collar allows an operator to see an irrigation hose inserted into the gap.

13 Claims, 5 Drawing Sheets

(56) References Cited

U.S. PATENT DOCUMENTS

| | | | | |
|---|---|---|---|---|
| 4,946,200 A | * | 8/1990 | Blenkush | F16L 33/225 |
| | | | | 285/255 |
| 4,963,133 A | * | 10/1990 | Whipple | A61M 25/0014 |
| | | | | 285/242 |
| 6,416,085 B1 | | 7/2002 | Markovic | |
| 6,641,177 B1 | | 11/2003 | Pinciaro | |
| 2014/0103639 A1 | * | 4/2014 | Takai | F16L 33/227 |
| | | | | 285/81 |

FOREIGN PATENT DOCUMENTS

| | | |
|---|---|---|
| FR | 1290295 | 4/1962 |
| WO | WO 2007/049053 | 5/2007 |

OTHER PUBLICATIONS

Written Opinion dated Oct. 2, 2012 issued in PCT counterpart application (No. PCT/162012/050520).

* cited by examiner

IRRIGATION PIPE COUPLER

RELATED APPLICATIONS

This is a 35 USC 371 U.S. National Phase of International Application No. PCT/IB2012/050520, filed 4 Feb. 2012 and published in English as WO 2012/123827A2 on 20 Sep. 2012, which claims priority to U.S. Provisional application No. 61/452,118, filed 13 Mar. 2011. The contents of the aforementioned applications are incorporated by reference in their entirety.

TECHNICAL FIELD

Embodiments of the invention relate to an irrigation pipe coupler and in particular to an irrigation pipe coupler for connecting to an open end of an irrigation pipe.

BACKGROUND

When setting up an irrigation system, irrigation pipes often have to be connected to provide the desired configuration of the irrigation system. Irrigation pipe couplers that may be used to connect to a pipe in an irrigation system are usually formed with annular projecting ribs that are shaped to grip and "dig" into the inner surface of the pipe. To join an irrigation pipe to such a coupler, an end of the coupler is pressed into an open end of the irrigation pipe and in some cases the coupler is provided with an outer collar that presses the irrigation pipe onto the ribs to secure the pipe on the coupler.

U.S. Pat. No. 4,278,279 describes a coupling with a nipple that engages an interior diameter of an irrigation hose. The nipple has gripping edges that are formed on its exterior and the coupling also has a collar that can be moved in order to securely pinch the end of the hose against the gripping edges of the coupling.

SUMMARY

The following embodiments and aspects thereof are described and illustrated in conjunction with systems, tools and methods which are meant to be exemplary and illustrative, not limiting in scope.

In an embodiment there is provided an irrigation pipe coupler for engaging an open end of an irrigation pipe with an axial forward end thereof, the coupler comprising a nipple and an outer collar each having an axis, the nipple comprising an outwardly projecting barb; and the collar surrounding at least part of the nipple and comprising an inwardly projecting bulge and being slidably movable along the nipple between forward and rear terminal positions, the collar being spaced radially outwardly from the nipple via a peripheral gap when the nipple and the collar extend coaxially, and the gap being re-defined between the collar and nipple for each new position of the collar when moved along the nipple, wherein the coupler comprises a rear stop that stops the collar from sliding to positions rear to the rear terminal position and when the collar abuts the rear stop the gap formed at that position is adapted to receive the irrigation pipe until a position where its open end is located rear to the bulge of the collar.

Optionally, at each position of the collar along the nipple the gap comprises a narrow region measured in the radial direction where the collar is closest to the nipple, and wherein the narrow region gets smaller during at least part of the forward movement of the collar along the nipple.

Optionally, the coupler comprises a centering means that is adapted to maintain the collar and nipple coaxial during movement of the collar along the nipple.

If desired, the narrow region at its smallest size is measured between portions of the bulge and the barb.

Typically, the bulge comprises a plurality of inwardly projecting teeth.

Optionally, the collar comprises at least one hollow window that extends radially through a portion of the collar at a position along the collar that is rear to the bulge.

Typically, the coupler comprises a base, the nipple extending forwardly from the base and the collar being in sliding engagement with the base for supporting the slidable movement of the collar along the nipple.

Optionally, the sliding engagement between the collar and the base maintains the collar and nipple substantially coaxial as the collar is slidably moved along the nipple between the forward and rear terminal positions.

In accordance with an embodiment there is also provided a method for coupling between a coupler and an irrigation pipe comprising the steps of: providing a coupler that is adapted to engage an open end of an irrigation pipe with a forward end thereof, the coupler comprising a nipple and an outer collar, the nipple comprising an outwardly projecting barb and the collar being slidably movable in a path defined along the nipple between forward and rear terminal positions, the coupler comprising a rear stop that stops the collar from sliding out of the path to positions rear to the rear terminal position and the collar surrounding at least a part of the nipple and comprising an inwardly projecting bulge, providing an irrigation pipe having an open end, fitting the pipe with its open leading over the nipple and then urging the pipe rearward to between the collar and nipple together with the collar that gets engaged therewith to a position where the collar bears against the rear stop and the open end of the pipe is rear to the bulge, and urging the pipe forwardly together with the collar that is engaged therewith adjacent the bulge to reach a position where the pipe is secured to the coupler.

Optionally, the coupler comprises also a forward stop that stops the collar from sliding out of the path beyond the forward terminal position.

Typically, the collar comprises a hollow window that extends radially through a portion of the collar at a position along the collar that is rear to the bulge, and the urging of the pipe rearward to position its open end rear to the bulge is performed until the window overlies a portion of the pipe that includes its open end.

Optionally, the collar is kept spaced radially outwardly from the nipple via a peripheral gap while being slidably moved along the nipple.

Typically, the gap is re-defined between the collar and nipple for each new position of the collar when moved along the nipple, and at each such new position the gap comprises a narrow region measured in the radial direction where the collar is closest to the nipple, and the narrow region gets smaller at least during part of the forward movement of the collar along the nipple.

Optionally, the narrow region gets smaller at least during the end part of the forward movement of the pipe and collar that secures the pipe to the coupler.

If desired, forward movement of the collar just beyond the position where it can secure the pipe to the nipple is adapted to form a gap with a smaller narrow region.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
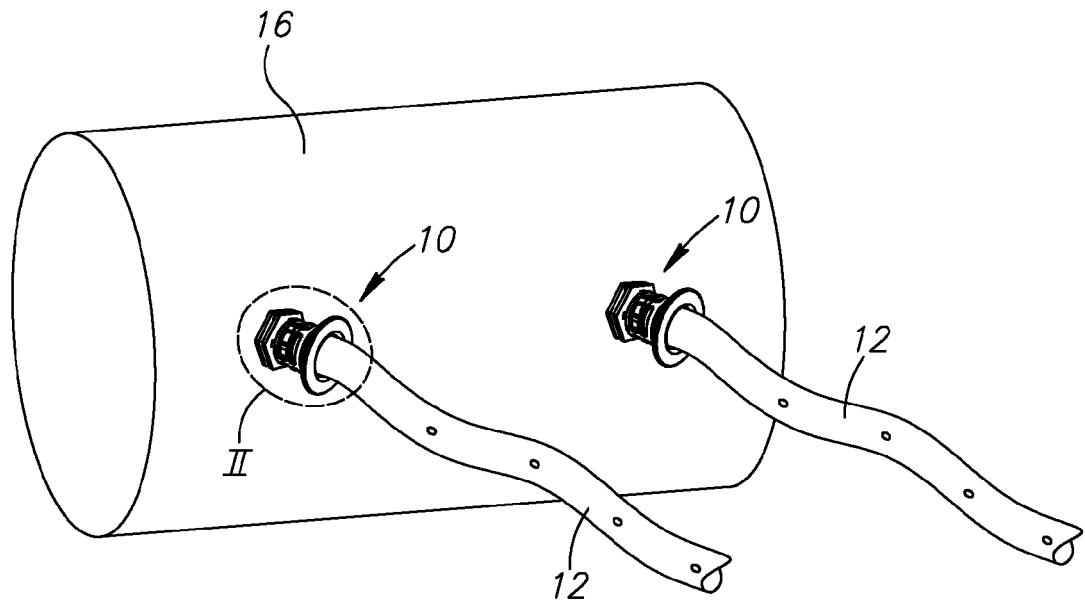
FIG. 1 schematically shows a perspective view of a main distribution pipe and a drip irrigation pipe that branches off from the main pipe, a coupling assembly including a coupler in accordance with an embodiment of the present invention being coupled to the drip irrigation pipe.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
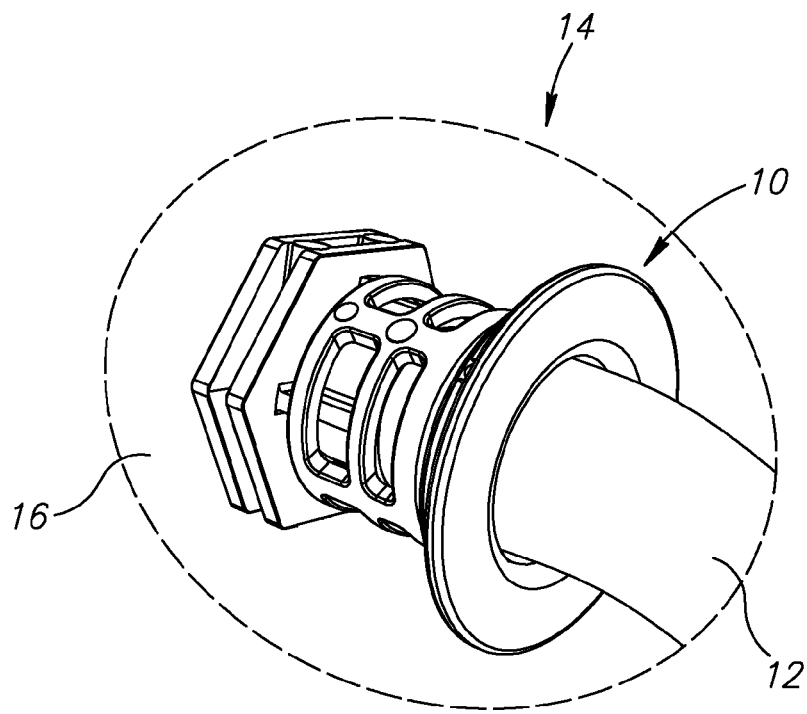
FIG. 2 schematically shows a section of FIG. 1.

Attention is first drawn to FIGS. 1 and 2 to show a coupler 10 in accordance with various embodiments of the present invention that can be used to connect between irrigation pipes 12 in a field to form a desired configuration of an irrigation system. The coupler 10 can be used in various configurations of irrigation accessories and in the example shown in these figures it is seen that a single coupler 10 can be part of a coupling accessory 14 that connects between a main distribution pipe 16 and a lateral drip irrigation pipe 12 that branches off from the main distribution pipe.

Figure 3:
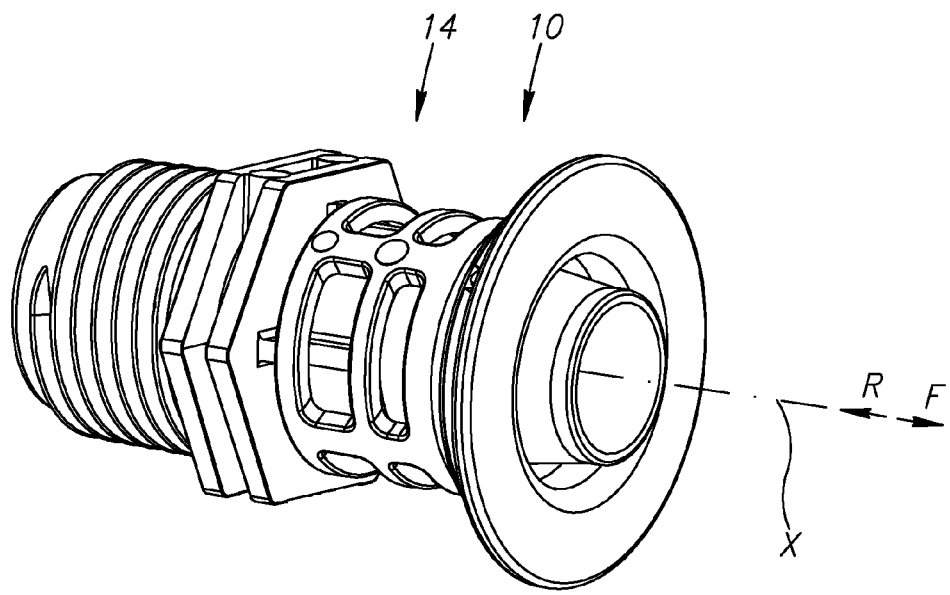
FIG. 3 schematically shows a perspective view of the coupling assembly with a coupler in accordance with an embodiment of the present invention.
Figure 4:
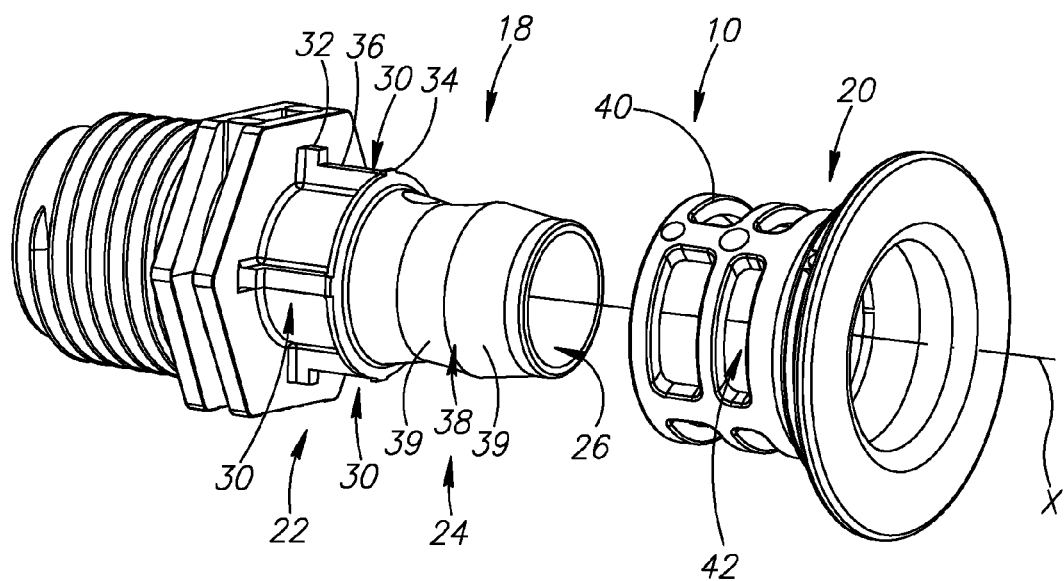
FIG. 4 schematically shows an exploded view of the coupler with a collar of the coupler being displaced from its normal position in the coupler.

Attention is now drawn to FIGS. 3 and 4. The coupling accessory 14 may be threaded at its side that connects to the main distribution pipe 16 to provide threading engagement with the main pipe. However it is noted that the coupling accessory 14 may include any number of couplers 10. For example, in an embodiment a coupling accessory (not shown) may include two or more couplers 10 with one of the couplers for example replacing the threaded part that is shown in these figures.

The coupler 10 has an axis X, and a core 18 and a collar 20 each with a respective axis that is substantially coaxial with the axis X at least when the coupler 10 is fully assembled to a pipe 12. The axis X defines opposing axial forward and rear directions F, R and each part of the coupler 10 also when described alone will be described in an orientation where it extends coaxial to the axis X, and therefore in relation to the axis X and to the forward and rear directions. It should be noted that directional terms appearing throughout the specification and claims, e.g. "forward", "rear", "up", "down" etc., (and derivatives thereof) are for illustrative purposes only, and are not intended to limit the scope of the appended claims. In addition it is noted that the directional terms "down", "below" and "lower" (and derivatives thereof) define identical directions.

The core 18 includes a base 22 and a nipple 24 and the collar 20 surrounds at least portions of the core 18 during use of the coupler 10. Attention is additionally drawn to FIGS. 5 and 6. The coupler 10 has a lumen 26 that is formed therein along the axis X. The lumen 26 provides a path for fluid communication through the coupler 10 when the coupler is assembled to an open end 28 of an irrigation pipe 12, and the base 22 and the nipple 24 surround axially adjacent respective rear and forward portions of the lumen 26. The base 22 has a plurality of axially extending rails 30 (best seen in FIG. 4) that are formed on its outer periphery. The rails 30 are symmetrically distributed about the axis X, and each rail 30 has a rear stop 32 at a rear end of the base 22, a forward stop 34 at a forward end of the base 22 and a neck 36 therebetween. The rear and forward stops 32, 34 project radially outwardly above the neck 36 in each rail 30, and the nipple 24 extends forwardly from the forward end of the base 22 and includes an outwardly projecting peripheral barb 38 that is formed on its outer face. Barb 38 projects away from the axis X and optionally includes two peripheral tapering surfaces 39 that converge towards each other in a direction away from the axis X.

The collar 20 has an inner space that extends axially therethrough along the axis X. The collar 20 also has a rear anchor 40, at least one window 42 and a peripheral bulge 44. The bulge 44 is formed on an inner face of the collar 20 that envelopes the inner space of the collar 20 and projects radially into the inner space. The bulge 44 has a rim 45 at a rear end thereof, and optionally the bulge 44 tapers rearward towards the axis X on its way to the rim 45. Rim 45 may include sharp edges or teeth that can engage and grip onto the outer face of the pipe 12 when the coupler 10 is coupled to the pipe 12. The window 42 extends radially through the collar 20 to communicate between the inner space of the collar 20 and the outer exterior of the collar 20. The window 42 opens into the inner space rear to the rim 45 of the bulge 44 so that any object that is advanced rearward through the inner space of the collar 20 can be seen from outside of the collar 20 when it passes the rim 45.

Figure 5:
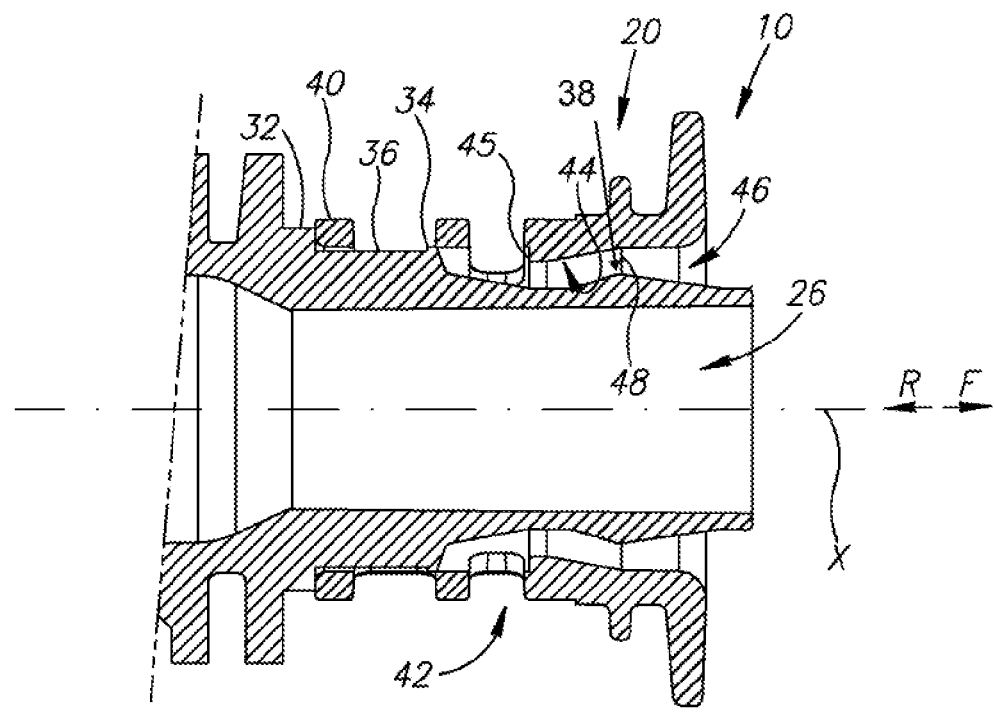
FIG. 5 schematically shows a cross sectional view of the coupler with the collar being located at a rear terminal position.
Figure 6:
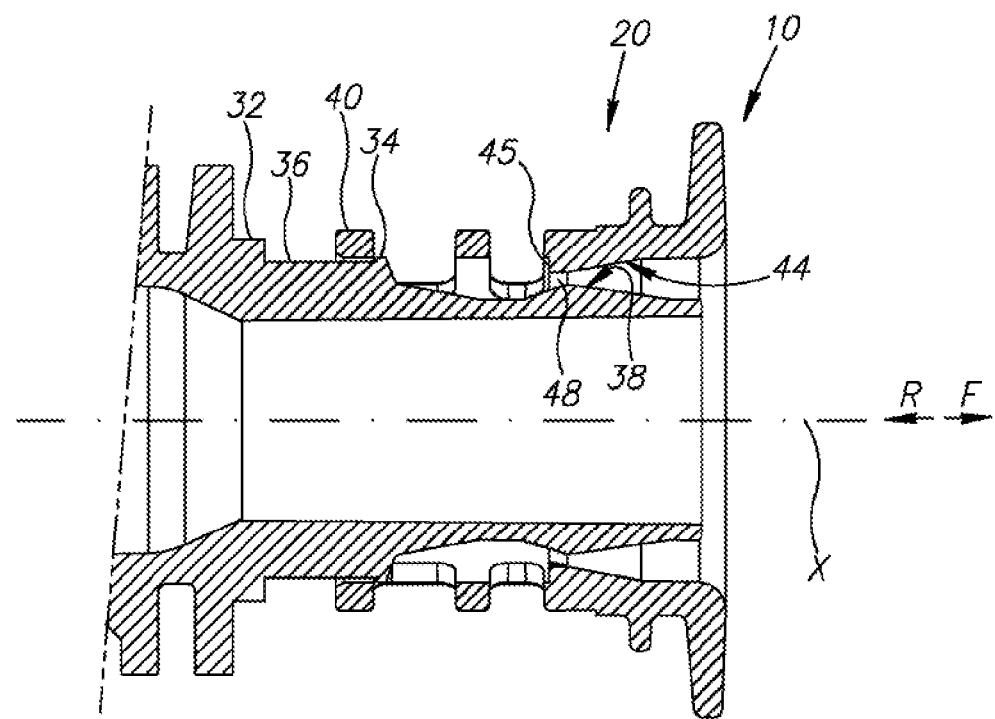
FIG. 6 schematically shows a cross sectional view of the coupler with the collar being located at a forward terminal position.

In an embodiment of the coupler 10, the collar 20 surrounds the core 18 of the coupler 10 with its anchor 40 surrounding and slidably engaging the rails 30 of the base 22 at their necks 36. The collar 20 can slide forward and rear relative to the core 18 by virtue of the sliding engagement that exists between the anchor 40 and the necks 36. This sliding engagement also acts as a centering means that maintains the collar 20 and nipple 24 substantially coaxial and thereby keeps remaining portions of the collar 20 that are forward to the anchor 40 spaced radially outwardly from the nipple 24 via a peripheral gap 46. The collar 20 can slide along the nipple 24 between forward and rear terminal positions. In the forward terminal position the anchor 40 engages the forward stop 34 of the base 22 which keeps it from being detached from the core 18 (FIG. 6). As also seen in FIG. 6, when the collar 20 is in the forward terminal position, the collar's inwardly projecting bulge 44 is opposite the nipple's outwardly projecting barb 38. In the rear terminal position the anchor 40 engages the rear stop 32 of the base 22 which stops the collar 20 from moving rearward beyond that position (FIG. 5). As also seen in FIG. 5, the collar 20 is of sufficient axial length as compared to the nipple 24, that when the collar 20 is in the rear terminal position and abuts the rear stop 32, the collar 20 axially extends past the nipple's projecting barb 38 in the forward axial direction F.

The gap 46 between the collar 20 and the nipple 24 is re-defined for each new position of the collar 20 when it is moved along the nipple 24. At each such new position the gap 46 may have a narrow region 48 that is measured in the radial direction and at that narrow region 48 the collar 20 is closest to the nipple 24. In an embodiment, the narrow region 48 becomes smaller during at least part of the forward movement of the collar 20 along the nipple 24.

Attention is now drawn to FIGS. 7 to 10. The assembly between the pipe 12 and the coupler 10 may be performed by for example axially urging the coupler 10 forwardly so that its nipple 24 first fits into the open end 28 of the pipe 12, or by urging the pipe 12 axially rearward with its open end 28 leading to fit over the nipple 24, or by urging both the nipple 24 and the pipe 12 axially towards each other so that the pipe 12 is fitted onto the nipple 24 with its open end 28 facing axially rearward. The assembly steps between the pipe 12 and the coupler 10 will be descried herein below with respect to the optional case that the pipe 12 is urged onto the coupler 10 however it is understood that other cases described above are also possible. Also in the example shown in FIGS. 7 and 8 the collar 20 is shown at its forward terminal position when the assembly between the pipe 12 and the coupler 10 begins however it is noted that the collar 20 may be at any position along the nipple 24 when starting the assembly.

Figure 7:
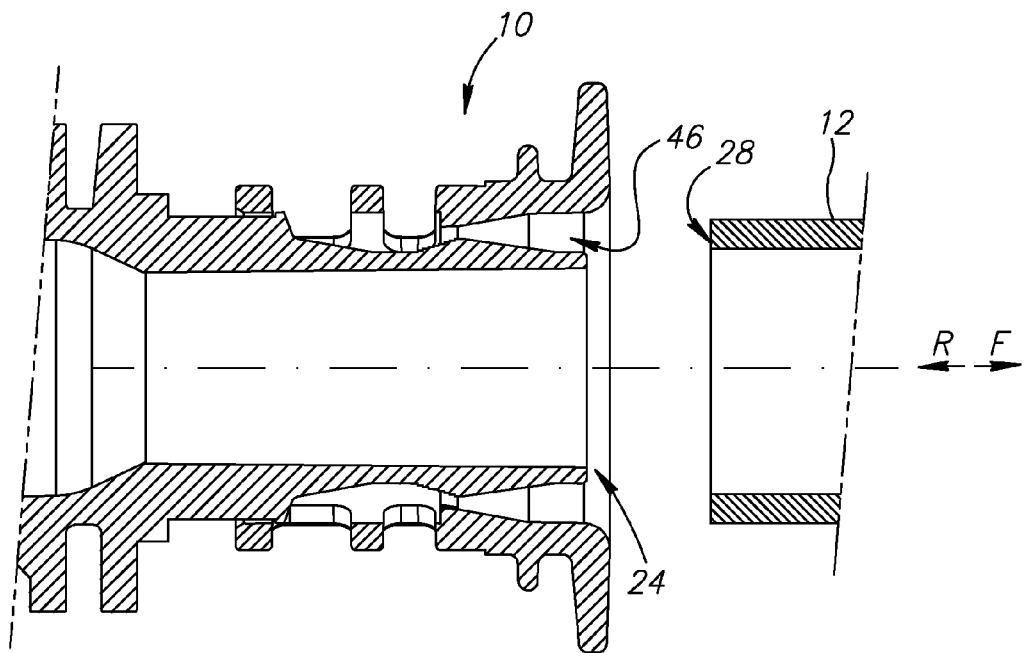
FIGS. 7 to 10 schematically show various stages that may be performed when coupling between an irrigation pipe and a coupler in accordance with an embodiment of the present invention.
Figure 8:
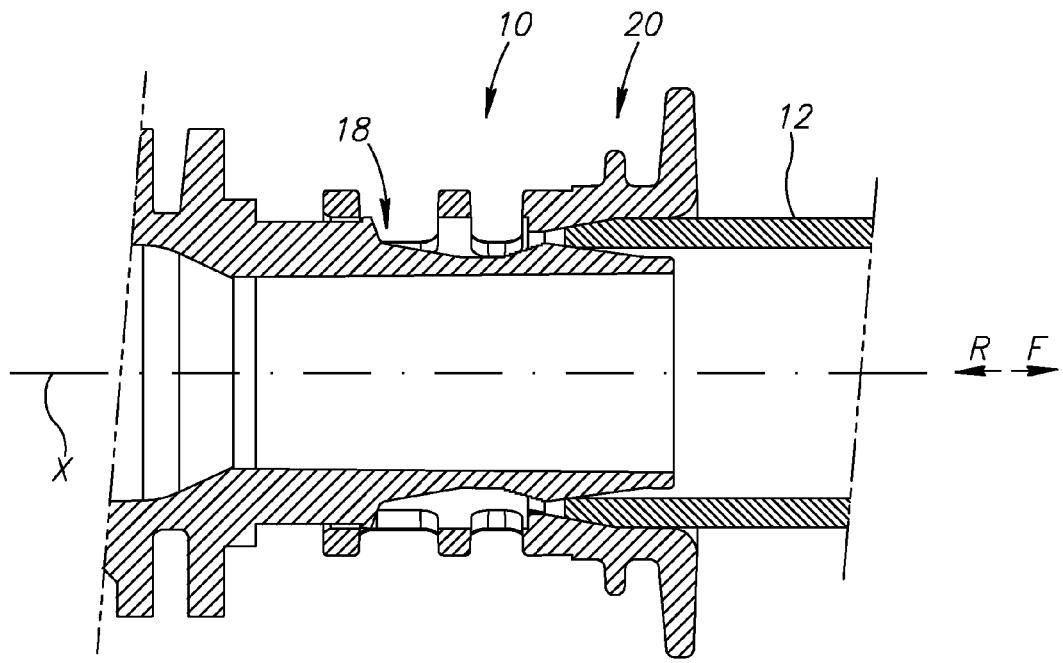
Figure 9:
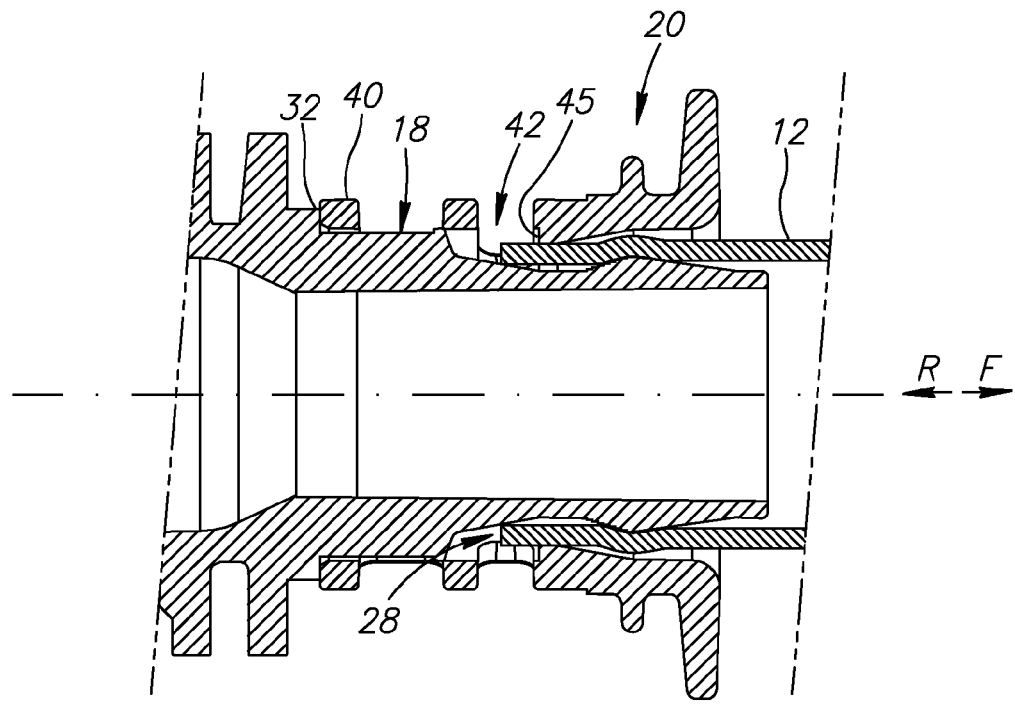

To begin the assembly between the pipe 12 and the coupler 10, the pipe 12 is optionally urged rearward with its open end 28 leading in order to fit onto the nipple 24 of the coupler 10 (FIGS. 7 and 8). If the collar 20 is initially at a position forward to its rear terminal position then the pipe 12 as it is urged rearward will start to bear with its outer face against the collar 20 and urge the collar 20 rearward towards its rear terminal position. The pipe 12 can be urged rearward relative to the nipple 24 until a state where the collar 20 is at its rear terminal position and/or the rear end 28 of the pipe 12 passes the rim 45 of the collar 20 and can be seen from outside of the collar 20 via the window 42 (FIG. 9).

Figure 10:
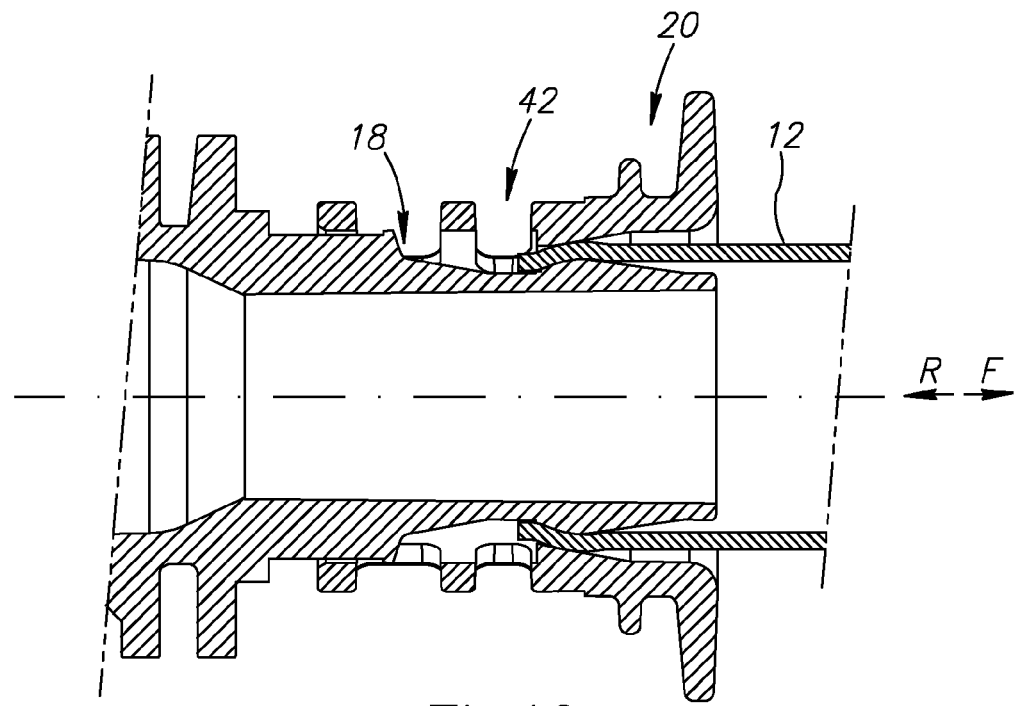

Optionally, the view of the rear end 28 of the pipe 12 via the window 42 serves as a visual indication that the pipe 12 has been sufficiently urged rearward relative to the collar 20 and nipple 24 and from this state the pipe 12 can be urged forwardly relative to the core 18 of the coupler 10 to complete the assembly. The outer face of the pipe 12 engages the bulge 44 of the collar 20 optionally at the rim 45 and urges the collar 20 to slide forwardly therewith. During at least part of this forward movement, the narrow region 48 gradually decreases until a position is reached where the pipe 12 is firmly gripped and secured between the collar 20 and nipple 24 (FIG. 10). Optionally, at this position where the pipe 12 is firmly gripped, the narrow region 48 is measured between portions of the bulge 44 and the barb 38. Forward movement of the collar 20 just beyond the position where the pipe 12 is firmly gripped to the coupler 10, may result in a formation of a gap 46 with an even smaller narrow region 48 that increases the tightening of the coupler 10 to the pipe 12.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

The invention claimed is:

1. An irrigation pipe coupler for engaging an open end of an irrigation pipe with an axial forward end thereof,
    the coupler comprising a nipple and an outer collar each having an axis, the nipple comprising an outwardly projecting barb; and the collar surrounding at least part of the nipple and comprising an inwardly projecting bulge and being slidably movable along the nipple between forward and rear terminal positions,
    the collar being spaced radially outwardly from the nipple via a peripheral gap when the nipple and the collar extend coaxially, and the gap being re-defined between the collar and nipple for each new position of the collar when moved along the nipple, wherein;
    the coupler comprises a rear stop that stops the collar from sliding to positions rear to the rear terminal position;
    when the collar is in the rear terminal position and abuts the rear stop:
        the gap formed at that position is adapted to receive the irrigation pipe until a position where an open end of the irrigation pipe is located rear to the bulge of the collar; and
        the collar extends past the nipple's projecting barb in a forward axial direction of the coupler; and
    when the collar is in the forward terminal position:
        the inwardly projecting bulge of the collar is opposite the nipple's outwardly projecting barb.

2. The irrigation pipe coupler according to claim 1, wherein at each position of the collar along the nipple the gap comprises a narrow region measured in the radial direction where the collar is closest to the nipple, and wherein
    the narrow region gets smaller during at least part of the forward movement of the collar along the nipple.

3. The irrigation pipe coupler according to claim 1 and comprising a centering means that is adapted to maintain the collar and nipple coaxial during movement of the collar along the nipple.

4. The irrigation pipe coupler according to claim 3, wherein the narrow region at its smallest size is measured between portions of the bulge and the barb.

5. The irrigation pipe coupler according to claim 4, wherein the bulge comprises a plurality of inwardly projecting teeth.

6. The irrigation pipe coupler according to claim 1, wherein the collar comprises at least one hollow window that extends radially through a portion of the collar at a position along the collar that is rear to the bulge, whereby an irrigation pipe inserted into the coupler is visible through the window.

7. The irrigation pipe coupler according to claim 3 and comprising a base, the nipple extending forwardly from the base and the collar being in sliding engagement with the base for supporting the slidable movement of the collar along the nipple.

8. The irrigation pipe coupler according to claim 7, wherein the sliding engagement between the collar and the base maintains the collar and nipple substantially coaxial as the collar is slidably moved along the nipple between the forward and rear terminal positions.

9. An irrigation pipe coupler assembly for engaging an open end of an irrigation pipe, the coupler assembly comprising a core coaxially connectable to a collar along a coupler longitudinal axis (X) which defines opposing axial forward and axial rear directions, wherein:
   the core comprises a base connected to a nipple;
      the base comprising plurality of axially extending rails formed on an outer periphery thereof, each rail having a rear stop at a rear end of the base, a forward stop at a forward end of the base and a neck therebetween, with the rear and forward stops projecting radially outwardly above the neck;
      the nipple extending forwardly from a forward end of the base and including a lumen, the nipple having an outwardly projecting peripheral barb formed on an outer face of the nipple; and
   the collar comprises an outer exterior, an inner space, a rear anchor, at least one window and a peripheral bulge formed on an inner face of the collar, wherein:
      the bulge has a rim at a rear end thereof; and
      the window extends radially through the collar and opens into the inner space rear to the rim of the bulge and forward of the rear anchor; and
   wherein, when the collar is coaxially connected to the core:
      the collar surrounds the core with the rear anchor surrounding the rails of the base at their necks;
      the collar is slidably movable along the rails between forward and rear terminal positions,
      in the forward terminal position, the anchor engages the forward stop of the base which keeps the collar from being detached from the core and the peripheral bulge of the collar is opposite the nipple's outwardly projecting barb; and
      in the rear terminal position, the collar extends past the nipple's projecting barb in the forward axial direction, and the anchor engages the rear stop of the base which stops the collar from moving further rearward.

10. The irrigation pipe coupler assembly according to claim 9, wherein:
   the outwardly projecting peripheral barb comprises two peripheral tapering surfaces that converge towards each other; and
   the bulge comprises a plurality of inwardly projecting teeth.

11. The irrigation pipe coupler assembly according to claim 9, wherein, when the collar is coaxially connected to the core:
   the collar is spaced radially outwardly from the nipple via a peripheral gap whose dimension and shape are redefined between the collar and nipple for each new position of the collar when moved along the nipple; and
   when the collar abuts the rear stop, the gap formed at that position is adapted to receive the irrigation pipe until a position where an open end of the irrigation pipe is located rear to the bulge of the collar, and the irrigation pipe can be seen through the window from outside of the collar.

12. The irrigation pipe coupler assembly according to claim 11, wherein:
   at each position of the collar along the nipple the gap comprises a narrow region measured in the radial direction where the collar is closest to the nipple, and wherein
   the narrow region gets smaller during at least part of a forward movement of the collar along the nipple.

13. The irrigation pipe coupler assembly according to claim 11, wherein the base is connected, at a rear end thereof, to a coupling accessory having a threaded portion configured to connect to a main pipe.

* * * * *